(12) United States Patent
Durocher et al.

(10) Patent No.: US 12,234,769 B2
(45) Date of Patent: Feb. 25, 2025

(54) AIRCRAFT PROPULSION SYSTEM WITH TURBINE ENGINE AND EXHAUST HEAT EXCHANGER

(71) Applicant: Pratt & Whitney Canada Corp., Longueuil (CA)

(72) Inventors: Eric S. Durocher, Boucherville (CA); Scott Smith, St-Lambert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/216,141

(22) Filed: Jun. 29, 2023

(65) Prior Publication Data

US 2025/0003368 A1 Jan. 2, 2025

(51) Int. Cl.
*F02C 7/10* (2006.01)
*F28D 7/10* (2006.01)
*F28D 21/00* (2006.01)

(52) U.S. Cl.
CPC ............... *F02C 7/10* (2013.01); *F28D 7/103* (2013.01); *F28D 21/0003* (2013.01); *F05D 2260/221* (2013.01)

(58) Field of Classification Search
CPC .... F02C 7/08; F02C 7/10; F02C 7/224; F28D 7/10; F28D 7/103; F28D 7/106; F28D 21/0001; F28D 21/0003; F05D 2260/213; F05D 2260/2214
See application file for complete search history.

(56) References Cited

U.S. PATENT DOCUMENTS

| | | | | | |
|---|---|---|---|---|---|
| 1,400,179 | A | * | 12/1921 | Pfeiffer | F28D 7/103 220/567.3 |
| 3,120,868 | A | * | 2/1964 | Ballantine | F28D 7/103 165/155 |
| 3,255,818 | A | * | 6/1966 | Beam, Jr. | F02G 5/02 165/166 |
| 3,267,673 | A | * | 8/1966 | Hemsworth | F02C 7/08 60/39.511 |

(Continued)

OTHER PUBLICATIONS

EP Search Report for EP Patent Application No. 24185535.2 dated Oct. 31, 2024.

*Primary Examiner* — Alain Chau
(74) *Attorney, Agent, or Firm* — Getz Balich LLC

(57) ABSTRACT

An aircraft propulsion system is provided that includes a turbine engine and an exhaust gas heat exchanger. The exhaust gas heat exchanger includes a central conduit, an outer radial plenum, fluid conduits, and inter-conduit passages. The fluid conduits are disposed in a nested arrangement. Each fluid conduit has inner and outer radial walls that extend axially between the forward and aft ends. The inner and outer radial walls are radially separated to form an internal fluid passage. Each fluid conduit is radially spaced apart from adjacent fluid conduits to define an axially extending exhaust gas passages. The inter-conduit passages include at least one inter-conduit passage that provides fluid communication between the central conduit and a first fluid conduit, and at least one inter-conduit passage that provides fluid communication between first and second fluid conduits. A serpentine fluid flow path extends through the fluid conduits and the inter-conduit passages.

20 Claims, 8 Drawing Sheets

(56) References Cited

U.S. PATENT DOCUMENTS

| | | | | |
|---|---|---|---|---|
| 4,089,370 | A | * | 5/1978 | Marchal .................... F28D 9/04 |
| | | | | 165/163 |
| 4,090,558 | A | * | 5/1978 | Akama ................... F28F 13/02 |
| | | | | 165/135 |
| 4,096,616 | A | * | 6/1978 | Coffinberry ............ B21D 53/06 |
| | | | | 29/890.036 |
| 4,215,743 | A | * | 8/1980 | Margittai ................ F28D 7/026 |
| | | | | 165/155 |
| 5,542,467 | A | | 8/1996 | Carpentier |
| 6,786,036 | B2 | | 9/2004 | Kight |
| 7,334,411 | B2 | * | 2/2008 | Vandermolen ........ F28D 7/0058 |
| | | | | 60/39.511 |
| 8,962,968 | B2 | * | 2/2015 | Brillet .................... H10N 10/13 |
| | | | | 136/200 |
| 9,500,128 | B2 | | 11/2016 | Rainer |
| 2001/0052231 | A1 | * | 12/2001 | Ryan .................... F28D 9/0018 |
| | | | | 29/890.03 |
| 2011/0283712 | A1 | * | 11/2011 | Brillet .................... F02K 1/822 |
| | | | | 60/801 |
| 2011/0302910 | A1 | | 12/2011 | Burgers |
| 2016/0054071 | A1 | * | 2/2016 | Cordova ................... F28F 7/02 |
| | | | | 165/164 |
| 2016/0282052 | A1 | * | 9/2016 | Vernon ................. C01C 1/0482 |
| 2022/0196332 | A1 | * | 6/2022 | Lynch ....................... F28F 1/06 |
| 2022/0290924 | A1 | * | 9/2022 | Eguchi ................. F28F 9/0278 |
| 2023/0011956 | A1 | | 1/2023 | Wiedenhoefer |
| 2023/0092417 | A1 | * | 3/2023 | Nakaharai .............. B33Y 80/00 |
| | | | | 165/158 |

\* cited by examiner

AIRCRAFT PROPULSION SYSTEM WITH TURBINE ENGINE AND EXHAUST HEAT EXCHANGER

BACKGROUND OF THE INVENTION

1. Technical Field

This disclosure relates to an aircraft in general, and to a turbine engine system for an aircraft in particular.

2. Background Information

Turbine engines typically exhaust high temperature gas during operation. Once exhausted, that high temperature gas and its inherent energy is lost. It would be desirable to recuperate the inherent energy within the exhaust to improve the performance of the turbine engine, including the Brayton cycle performance of the turbine engine.

SUMMARY

According to an aspect of the present disclosure, an aircraft propulsion system is provided that includes a turbine engine and an exhaust gas heat exchanger. The turbine engine is configured to produce exhaust gases during combustion. The exhaust gas heat exchanger extends axially along a central axis between a forward end and an aft end, and is disposed to receive exhaust gases from the turbine engine. The exhaust gas heat exchanger includes a central conduit, an outer radial plenum, a plurality of fluid conduits, and a plurality of inter-conduit passages. The fluid conduits are disposed in a nested arrangement. Each fluid conduit has an inner and an outer radial wall that each extend axially between the forward and aft ends. The inner radial wall is radially separated from the outer radial wall to form an internal fluid passage therebetween. Each fluid conduit is radially spaced apart from adjacent fluid conduits to define an axially extending exhaust gas passage disposed between adjacent fluid conduits. The inter-conduit passages include at least one inter-conduit passage configured to provide fluid communication between the central conduit and a first fluid conduit, and at least one inter-conduit passage that is configured to provide fluid communication between the first fluid conduit and a second fluid conduit. A serpentine fluid flow path extends through the fluid conduits and the inter-conduit passages.

In any of the aspects or embodiments described above and herein, the exhaust gas heat exchanger may be disposed relative to the turbine engine such that the exhaust gases from the turbine engine enter the forward end of the exhaust gas heat exchanger, pass through the exhaust gas passages disposed between adjacent fluid conduits, and exit the aft end of the exhaust gas heat exchanger.

In any of the aspects or embodiments described above and herein, each fluid conduit may have an axially extending cylindrical configuration.

In any of the aspects or embodiments described above and herein, each fluid conduit may have a circular cross-sectional geometry.

In any of the aspects or embodiments described above and herein, the circular cross-sectional geometry may extend at a constant radius.

In any of the aspects or embodiments described above and herein, the circular cross-sectional geometry may extend circumferentially in a wavy configuration.

In any of the aspects or embodiments described above and herein, the plurality of fluid conduits disposed in a nested arrangement may be concentric with one another.

In any of the aspects or embodiments described above and herein, the plurality of inter-conduit passages may include a first set of inter-conduit passages disposed at a first circumferential position, and a second set of inter-conduit passages disposed at a second circumferential position.

In any of the aspects or embodiments described above and herein, at least one inter-conduit passage within the first set of inter-conduit passages may be disposed adjacent to the forward end of the heat exchanger at the first circumferential position, and at least one inter-conduit passage within the first set of inter-conduit passages may be disposed adjacent to the aft end of the heat exchanger at the first circumferential position.

In any of the aspects or embodiments described above and herein, at least one inter-conduit passage within the second set of inter-conduit passages may be disposed adjacent to the forward end of the heat exchanger at the second circumferential position, and at least one inter-conduit passage within the second set of inter-conduit passages may be disposed adjacent to the aft end of the heat exchanger at the second circumferential position.

In any of the aspects or embodiments described above and herein, each fluid conduit has a circumference, and the internal fluid passage of each fluid conduit may be configured to have a first circumferential segment and a second circumferential segment, the first circumferential segment and the second circumferential segment fluidly isolated from one another, and the first set of inter-conduit passages may be in fluid communication with the first circumferential segment, and the second set of inter-conduit passages may be in fluid communication with the second circumferential segment.

In any of the aspects or embodiments described above and herein, the central conduit may be disposed radially inside of the fluid conduits, and the outer radial plenum may be disposed radially outside of the fluid conduits, and the serpentine fluid flow path may extend through the central conduit, the fluid conduits, the inter-conduit passages, and the outer radial plenum.

In any of the aspects or embodiments described above and herein, the system may include a flow expansion section disposed between a turbine section exit of the turbine engine and the exhaust gas heat exchanger, wherein the turbine section exit may have a first diameter and the exhaust gas heat exchanger may have a second diameter, wherein the second diameter is greater than the first diameter, and the flow expansion section may provide a flow transition boundary between the turbine section exit and the exhaust gas heat exchanger.

In any of the aspects or embodiments described above and herein, one or more of the exhaust gas conduits may include a plurality of first heat transfer features that extend into a first flow path defined by the respective exhaust gas conduit.

According to an aspect of the present disclosure, a turbine engine exhaust gas heat exchanger is provided that extends along a central axis between a forward end and an aft end. The exhaust gas heat exchanger includes a central conduit, an outer radial plenum, a plurality of fluid conduits, and a plurality of inter-conduit passages. The fluid conduits are disposed in a nested arrangement. Each fluid conduit has an inner radial wall and an outer radial wall, each extending axially between the forward and aft ends. The inner radial wall is radially separated from the outer radial wall to form an internal fluid passage therebetween. Each fluid conduit is radially spaced apart from adjacent fluid conduits to define an axially extending exhaust gas passage disposed between adjacent fluid conduits. The inter-conduit passages include at least one inter-conduit passage that is configured to provide fluid communication between the central conduit and a first fluid conduit, and at least one inter-conduit passage that is configured to provide fluid communication between the first fluid conduit and a second fluid conduit. A serpentine fluid flow path extends through the fluid conduits and the inter-conduit passages.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
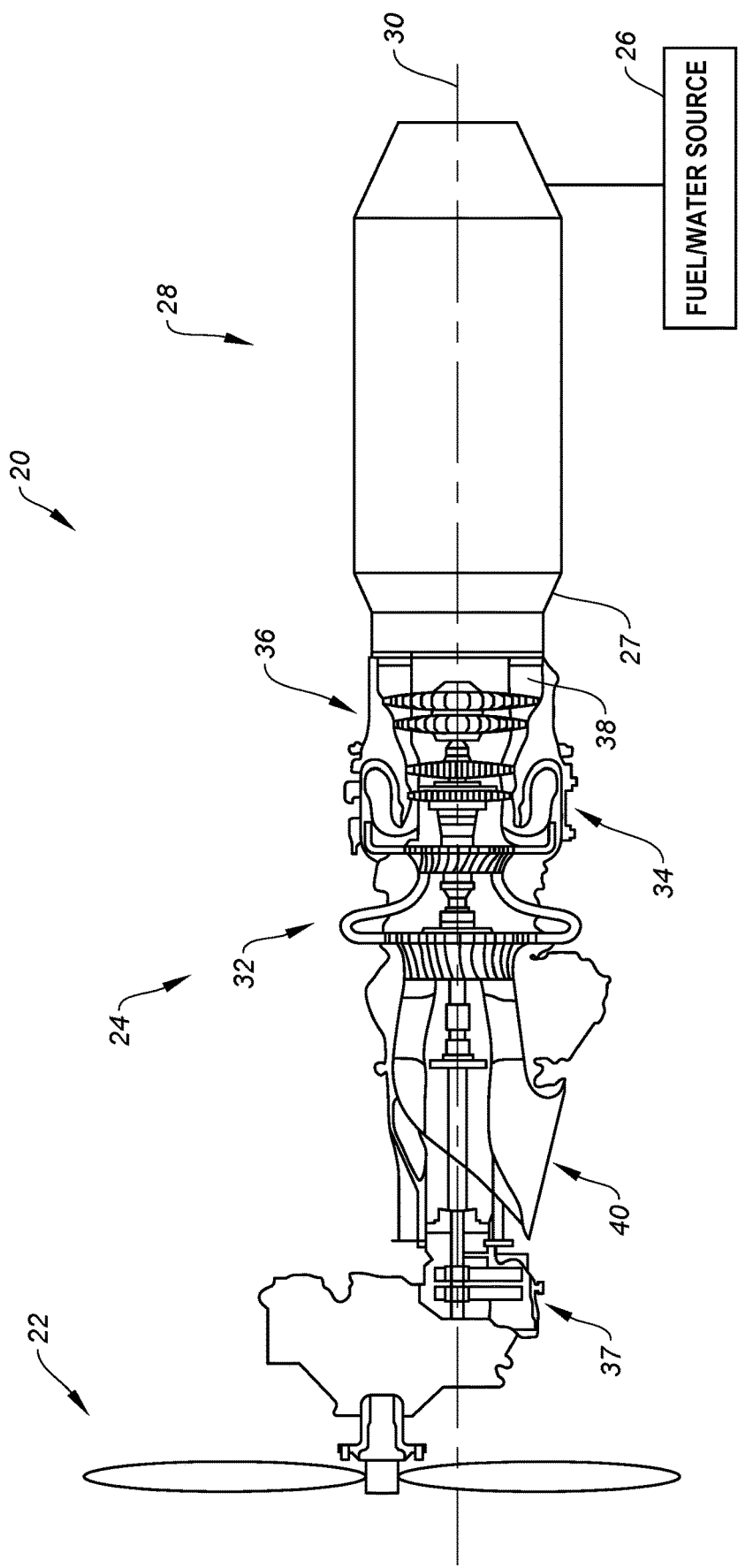
FIG. 1 is a diagrammatic partially sectioned view of a present disclosure propulsion system.

FIG. 1 diagrammatically illustrates a present disclosure propulsion system 20 for an aircraft. The aircraft may be an airplane, a helicopter, a drone (e.g., an unmanned aerial vehicle (UAV)) or any other manned or unmanned aerial vehicle or system. The propulsion system 20 shown in FIG. 1 includes a propulsor rotor 22, a turbine engine 24, a fuel source 26, and an exhaust gas heat exchanger 28. In some embodiments, an area expansion section 27 may be disposed axially forward of the exhaust gas heat exchanger 28. Non-limiting examples of a propulsor rotor 22 include a propeller rotor for a turboprop propulsion system, a rotorcraft rotor (e.g., a main helicopter rotor) for a turboshaft propulsion system, a propfan rotor for a propfan propulsion system, a pusher fan rotor for a pusher fan propulsion system, a fan for a turbofan propulsion system, or the like. Unless otherwise stated herein, the present disclosure is not limited to any particular turbine engine 24 configuration, or any propulsor rotor 22 configuration.

The turbine engine 24 extends axially along an axis 30 between an upstream, forward end and a downstream, aft end. The turbine engine 24 includes a compressor section 32, a combustor section 34, and a turbine section 36. A reduction gearbox 37 provides drive communication between the engine 24 and the propulsor rotor 22. A core flow path 38 extends sequentially through the compressor section 32, the combustor section 34, and the turbine section 36. Air enters the turbine engine 24 through an airflow inlet 40 upstream of the compressor section 32, passes through the core flow path 38, and exits the turbine engine 24. Thereafter, the core gas enters the exhaust gas heat exchanger 28. As indicated above, the present disclosure is not limited to any particular turbine engine 24 configuration and the aforesaid description of the core flow path 38 and engine component positioning is for illustration purposes and is not intended to be limiting.

Embodiments of the present disclosure propulsion system 20 may include a turbine engine 24 configured to combust non-hydrocarbon fuels (e.g., hydrogen or "$H_2$"), or hydrocarbon fuels (e.g., aviation fuel), or some mixture thereof. For example, the turbine engine 24 within a present disclosure system 20 embodiment may be configured to combust a fuel that is 100% non-hydrocarbon (e.g., 100% $H_2$), or a fuel that is 100% hydrocarbon (e.g., 100% aviation fuel), or a mixture thereof (e.g., a mixture of $H_2$ and aviation fuel). The present disclosure is not limited to any combusting any particular fuel. In those embodiments wherein the present disclosure system 20 combusts hydrogen, the fuel source 26 may be configured to store the hydrogen in liquid form and the present disclosure system 20 may be configured to process the hydrogen to a form (e.g., phase change to a gaseous phase) acceptable for combustion.

In those embodiments of the present disclosure that utilize a non-hydrocarbon fuel (e.g., H2 as a component within a fuel mixture, or as the sole engine fuel, or for other purpose), the non-hydrocarbon fluid may be one of the fluids that passes through the exhaust gas heat exchanger 28 with the other fluid being the turbine engine 24 exhaust gas. In some applications, the heat recuperated from the turbine engine 24 exhaust gas may be used to change the non-hydrogen fuel from a cryogenic liquid state to a gaseous state. In other embodiments, water in liquid form may be passed through the heat exchanger 28 to produce steam. In some applications, steam may be injected into the combustor 34 to increase engine power and/or to reduce undesirable engine emissions.

Referring to FIGS. 1-5, the exhaust gas heat exchanger 28 extends along a central axis 30 (e.g., coincident with the engine axis) between an exhaust gas inlet 42 and an exhaust gas outlet 44. The exhaust gas heat exchanger 28 may include a plurality of nested fluid conduits 46, a plurality of inter-conduit passages 48, a fluid port 50, a central conduit 52, and an outer radial plenum 54. The fluid port 50 (e.g., see FIG. 3) may be configured to provide fluid communication between a source of the fluid to be heated (e.g., non-hydrocarbon fuel, water, or the like) and the central conduit 52. The central conduit 52 is disposed centrally within the exhaust gas heat exchanger 28 (i.e., radially inside of the nested fluid conduits 46) and is in fluid communication with the radially innermost fluid conduit 46 of the nested fluid conduits 46. The outer radial plenum 54 may be an annular passage that extends around the entire outer circumference of the exhaust gas heat exchanger 28, or the outer radial plenum 54 may be a plurality of an annular passage segments that collectively extend around the substantially all the outer circumference of the exhaust gas heat exchanger 28, or the outer plenum may be a series of ports, or any combination thereof.

Figure 2:
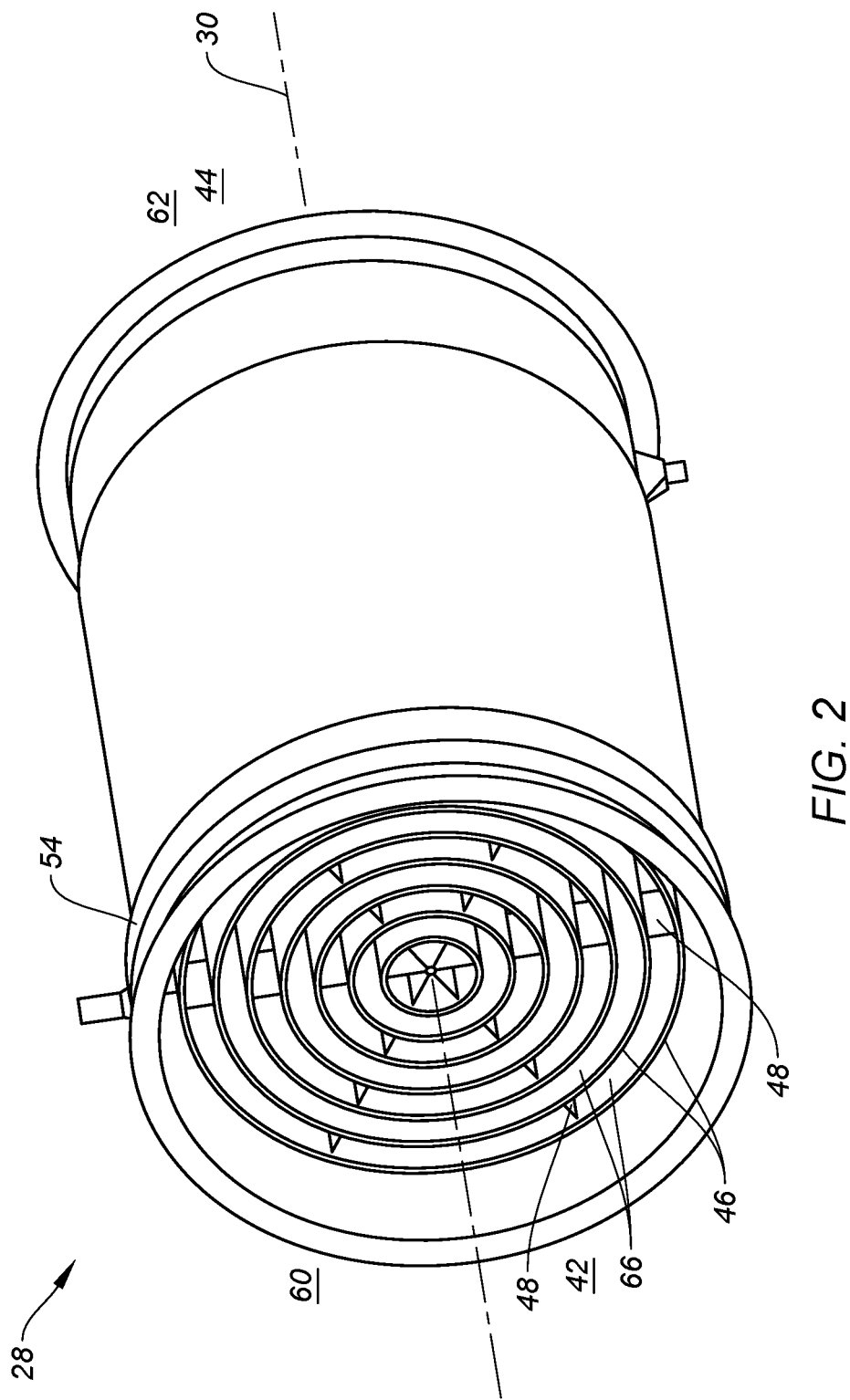
FIG. 2 is a perspective view of a present disclosure exhaust gas heat exchanger embodiment.
Figure 3:
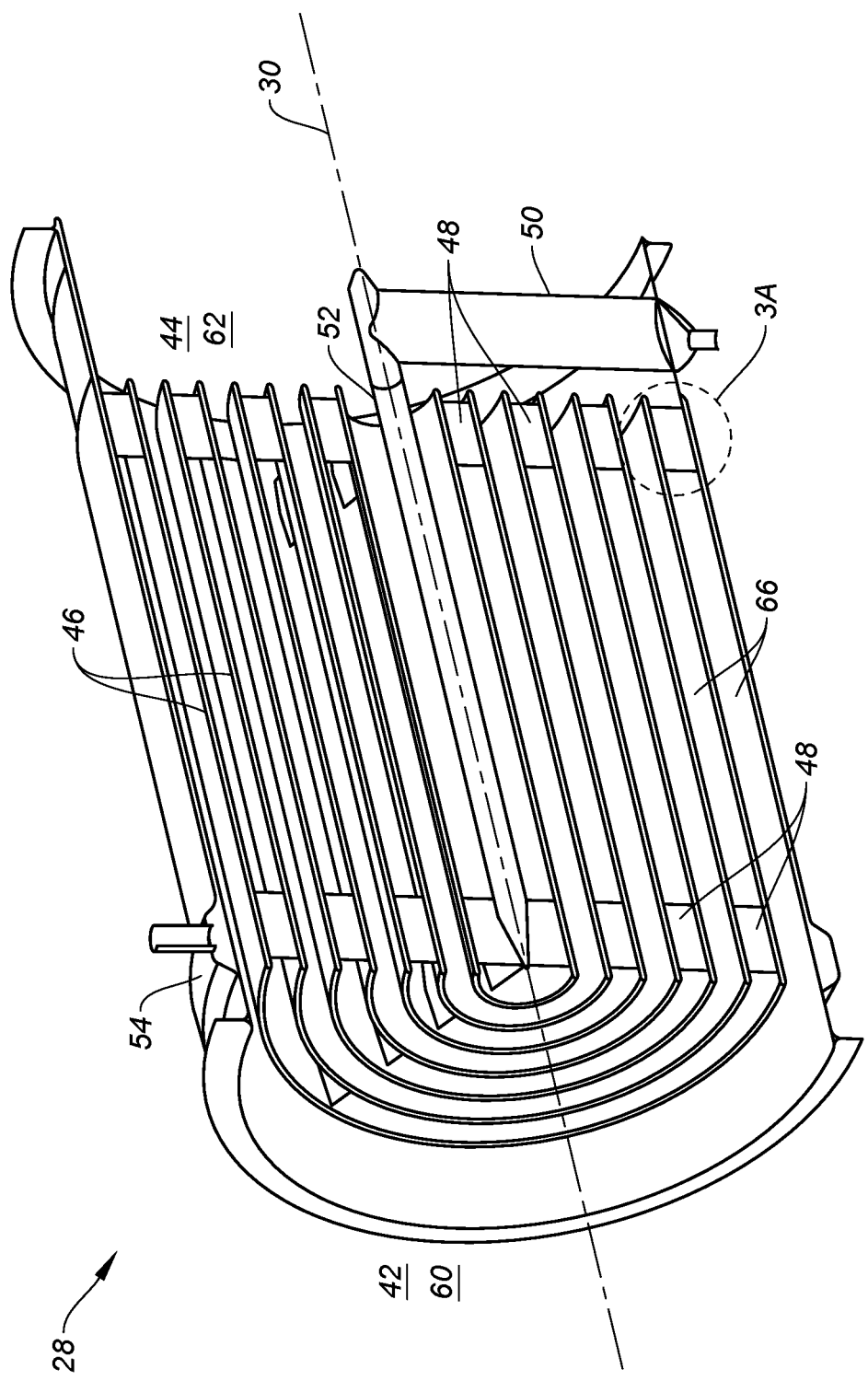
FIG. 3 is a sectioned view of the exhaust gas heat exchanger shown in FIG. 2.
Figure 3A:
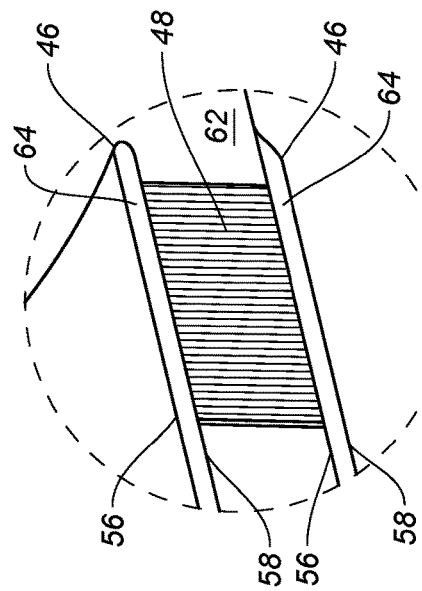
FIG. 3A is an enlarged view of a portion of the view shown in FIG. 3.
Figure 4:
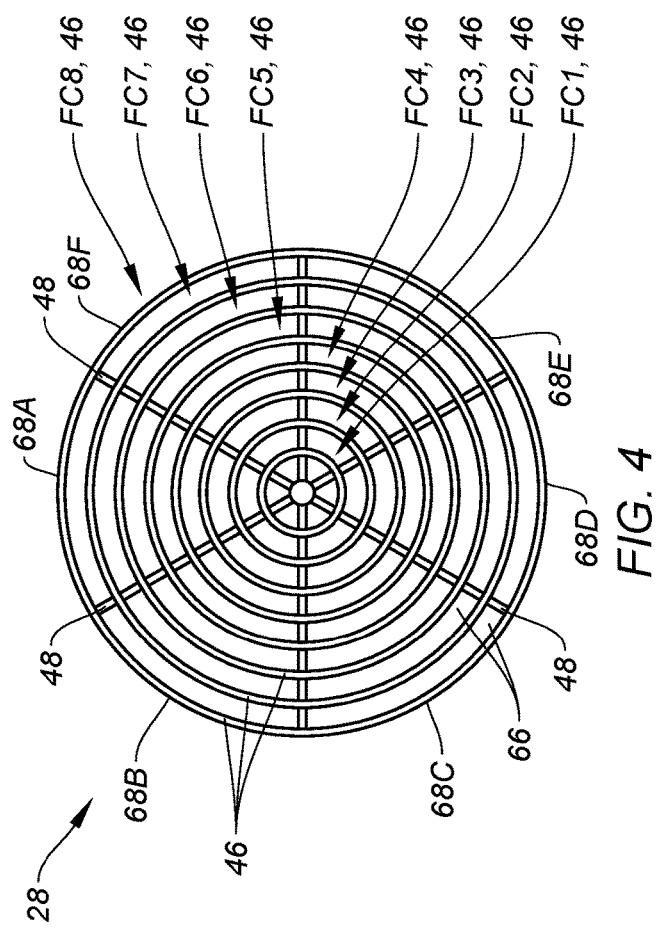
FIG. 4 is a diagrammatic end view of a present disclosure exhaust gas heat exchanger embodiment.
Figure 5:
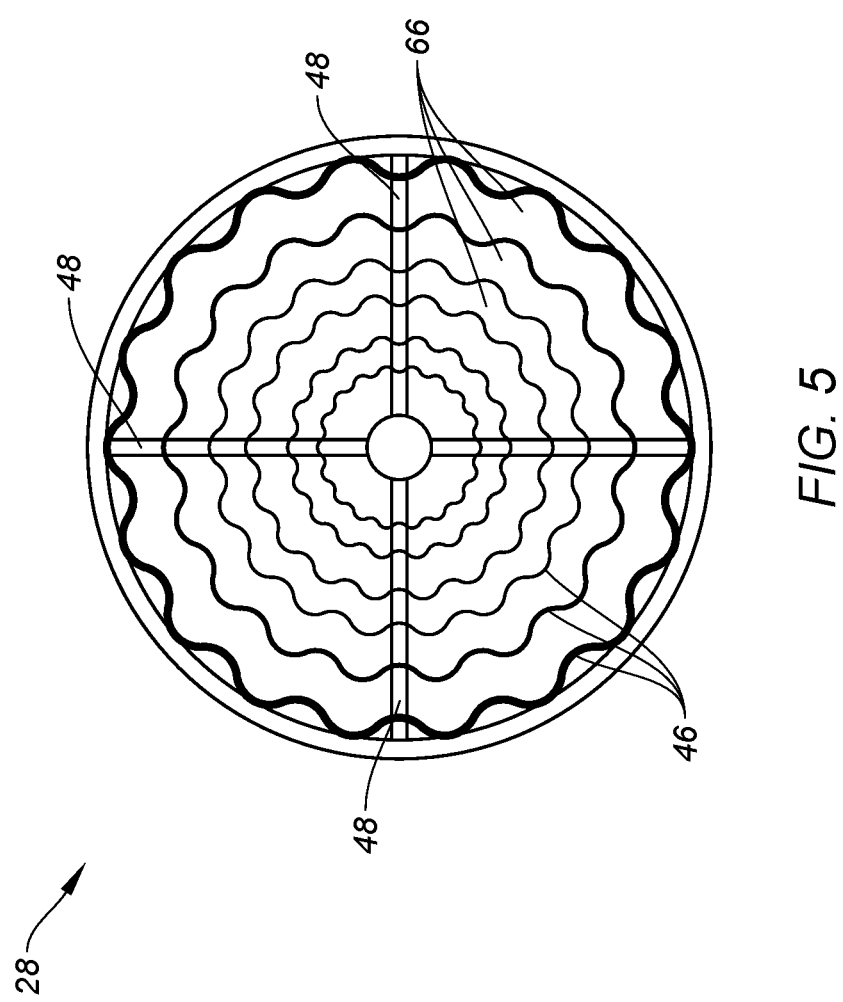
FIG. 5 is a diagrammatic end view of a present disclosure exhaust gas heat exchanger embodiment.

Each nested fluid conduit 46 includes inner and outer radial walls 56, 58 that extend axially from between a forward end 60 of the heat exchanger 28 and an aft end 62 of the heat exchanger 28. The inner and outer radial walls 56, 58 of each fluid conduit 46 are radially spaced apart from one another to define an internal fluid passage 64 (e.g., see FIG. 3A) therebetween. In some embodiments, the inner and outer radial walls 56, 58 may be parallel with one another. Each fluid conduit 46 is closed at the forward end 60 and the aft end 62. FIG. 3A is an enlarged portion of the perspective view shown in FIG. 3, showing a pair of fluid conduits 46 closed at the aft end 62. The nested fluid conduits 46 are disposed in a radial nested stack. Referring to FIG. 4, one can see a first fluid conduit 46 (FC1) disposed radially inside of a second fluid conduit 46 (FC2), and the second fluid conduit 46 (FC2) is disposed radially inside of a third fluid conduit 46 (FC3), and so on up to an eighth fluid conduit 46 (FC8) being the radially outermost fluid conduit 46. In the embodiment shown in FIGS. 2-4, the nested fluid conduits 46 are shown as having a cylindrical shape with a circular cross-sectional shape. Each fluid conduit 46 with a circular cross-sectional shape may be described as being collectively disposed at a radius; e.g., a constant radius wherein the outer radial wall 58 is disposed at a radius and the inner radial wall 56 is disposed at a radius. The present disclosure is not limited to nested fluid conduits 46 each having a cylindrical shape with a circular radiused cross-sectional shape. In some embodiments, the fluid conduits 46 may extend cylindrically between the forward and aft ends 60, 62, but may have an alternative cross-sectional shape. FIG. 5 diagrammatically illustrates a non-limiting example of an exhaust gas heat exchanger 28 that extends cylindrically and the fluid conduits 46 follow a wavy pattern (e.g., sinusoidal) circumferentially. The cross-sectional geometries shown in FIGS. 2-5 (i.e., circular at respective radii, wavy, and the like) are intended to be non-limiting examples.

As shown in FIGS. 2-5, the nested fluid conduits 46 may be disposed in a concentric arrangement, and may be spaced equidistant from each other. The present disclosure is not limited to any particular nested geometry.

Within the nested fluid conduits 46, each pair of adjacent fluid conduits 46 are in fluid communication with one another by means of one or more inter-conduit passages 48. The inter-conduit passages 48 are configured to permit fluid flow from a first fluid conduit 46 to pass through to an adjacent second fluid conduit 46.

Figure 6:
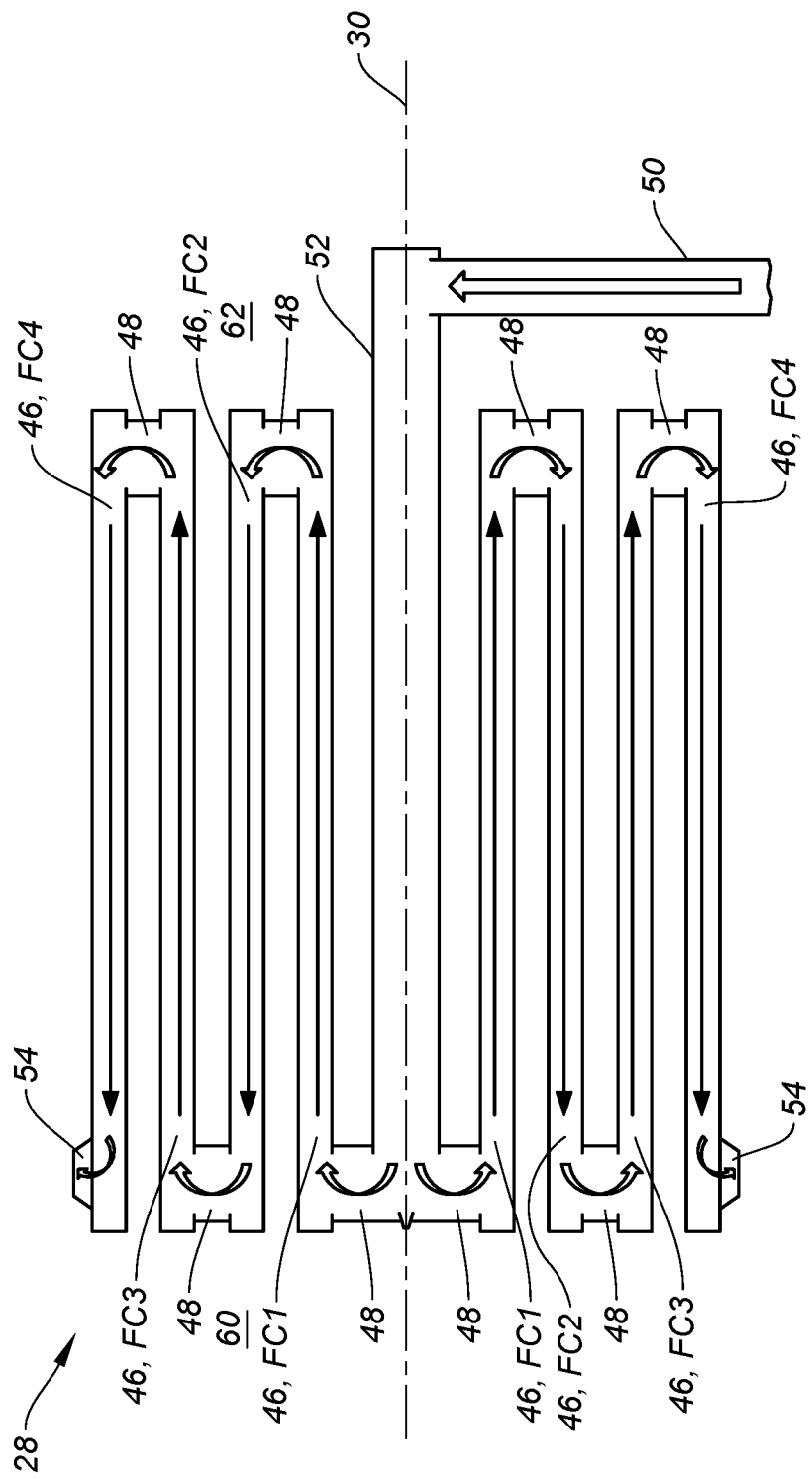
FIG. 6 is a diagrammatic side view of a present disclosure exhaust gas heat exchanger embodiment.

FIG. 6 diagrammatically illustrates a present disclosure exhaust gas heat exchanger 28 with the central conduit 52 in fluid communication a fluid port 50 and with a plurality of first inter-conduit passages 48. In this example, the central conduit 52 is in fluid communication with the fluid port 50 towards the aft end 62 of the heat exchanger 28 and in fluid communication with the first inter-conduit passages 48 towards the forward end 60 of the heat exchanger 28. The first inter-conduit passages 48, in turn, are in fluid communication with the radially innermost fluid conduit 46 (FC1). The FC1 is in fluid communication with a plurality of second inter-conduit passages 48 disposed toward the aft end of FC1. The second inter-conduit passages 48, in turn, are in fluid communication with the adjacent fluid conduit 46 (FC2) disposed radially outside of FC1. FC2 is in fluid communication with a plurality of third inter-conduit passages 48 disposed toward the forward end of the FC2. The third inter-conduit passages 48, in turn, are in fluid communication with the adjacent fluid conduit 46 (FC3) disposed radially outside of FC2. The third inter-conduit passages 48, in turn, are in fluid communication with the adjacent fluid conduit 46 (FC4) disposed radially outside of the FC3. FC4 is in fluid communication with an outer radial plenum 54. As can be seen in FIG. 6, the fluid conduits 46 and inter-conduit passages 48 are configured to form a serpentine fluid path between the fluid port 50 and the outer radial plenum 54.

The radially innermost fluid conduit 46 is disposed outside of and spaced apart from the central conduit 52. The radially innermost fluid conduit 46 and the central conduit 52 define an exhaust gas passage 66 therebetween that extends axially from the forward end 60 to the aft end 62 of the heat exchanger 28. Each pair of adjacent fluid conduits 46 are spaced apart in similar manner to produce a plurality of exhaust gas passages 66 therebetween that extend axially between the forward and aft ends 60, 62 of the heat exchanger 28.

Figure 7:
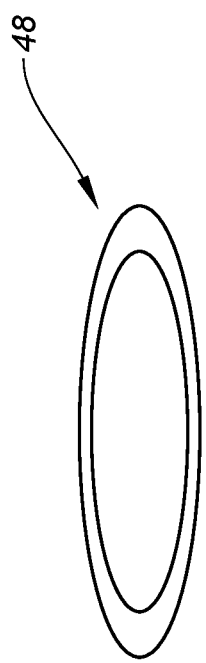
FIG. 7 is a diagrammatic sectional view of an inter-conduit passage embodiment.

The inter-conduit passages 48 may have an exterior configuration that is chosen to minimize fluid flow resistance (e.g., a substantially elliptical cross-sectional shape like that shown in FIG. 7), but the present disclosure is not limited to any particular inter-conduit passage 48 exterior configuration.

The inter-conduit passages 48 are disposed at one or more circumferential positions. FIGS. 2-4, for example, diagrammatically illustrate exhaust gas heat exchanger 28 embodiments having inter-conduit passages 48 disposed at six (6) circumferential positions. In these exemplary embodiments, the circumferential spacing between inter-conduit passages 48 is symmetrical; i.e., the inter-conduit passages 48 are spaced apart from one another at sixty degree) (60° intervals. The present disclosure is not limited to disposing inter-conduit passages 48 at any particular number of circumferential positions, and does not require symmetrical spacing of the inter-conduit passages 48. In some embodiments, the heat exchanger 28 may be configured with fluid conduits 46 that permit fluid flow around the entire circumference of the respective fluid conduit 46. In these embodiments, the inter-conduit passages 48 disposed at the one or more circumferential positions each provide fluid communication for the entire circumference of the respective fluid conduits 46. In some embodiments, the heat exchanger 28 may be configured with fluid conduits 46 configured to separate fluid flow into circumferential segments; e.g., two or more segments. Using the exhaust gas heat exchanger 28 embodiments diagrammatically shown in FIGS. 2-4 as an example, the fluid conduits 46 may be configured to separate fluid flow into six (6) circumferential segments 68A-F (e.g., see FIG. 4), with each segment in fluid communication with one of the six rows of inter-conduit passages 48 and each fluidly isolated from one another. Hence, fluid passing through the central conduit 52 enters into each circumferential segment via a respective inter-conduit passage 48 extending between the central conduit 52 and the respective segment of the radially innermost fluid conduit 46. The fluid passes thereafter through the respective fluid conduits 46 within the respective segment and subsequently passes into the outer radial plenum 54; e.g., following a serpentine fluid path.

In some embodiments, the diameter of the exhaust gas heat exchanger 28 may be greater that the diameter of a turbine section 36 exit of the turbine engine 24 disposed aft of the axially last turbine stage. The greater diameter of the exhaust gas heat exchanger 28 (and therefore cross-sectional area) may be chosen to increase the exhaust flow area through the heat exchanger 28 to account for cross-sectional area occupied by the fluid conduits 46 and thereby mitigate any flow impedance that may be associated with the exhaust gas heat exchanger 28 being disposed within the exhaust gas path. FIG. 1 illustrates an area expansion section 27 disposed axially between the turbine section 36 exit and the exhaust gas heat exchanger 28 configured to guide the exhaust gas flow into the larger diameter heat exchanger 28.

Figure 8:
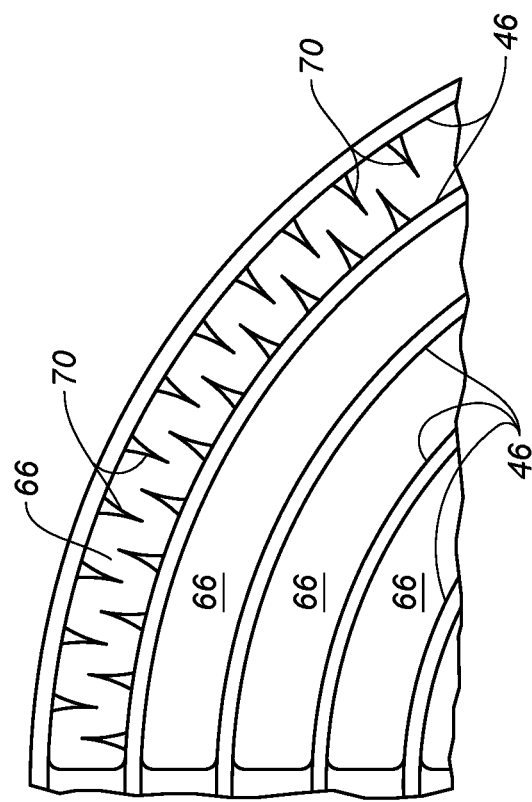
FIG. 8 is a diagrammatic partial view of a present disclosure exhaust gas heat exchanger embodiment.

Referring to FIG. 8, in some embodiments the present disclosure exhaust gas heat exchanger 28 may include heat transfer members 70 extending into the exhaust gas passages 66; e.g., extending outwardly from the inner radial wall of one or more of the fluid conduits 46, or extending outwardly from the outer radial wall of one or more of the fluid conduits 46, or any combination thereof. FIG. 8 diagrammatically illustrates heat transfer members 70 extending out from the inner radial wall of a first fluid conduit 46 and heat transfer members 70 extending outwardly from the outer radial wall of an adjacent second fluid conduit 46. In the example diagrammatically shown in FIG. 8, the heat transfer members 70 are configured as ribs that are axially aligned to minimize resistance to the exhaust gases flowing through the exhaust gas passages 66. The heat transfer members 70 are not limited to any particular configuration, and other heat transfer member configurations include pins and the like.

During operation of the present disclosure aircraft propulsion system 20, the turbine engine 24 is operated to combust a fuel/air mixture to produce power. The produced exhaust gases exit the turbine section 36 aft of the axially last turbine stage and are either directly passed into the exhaust gas heat exchanger 28 or are passed through the area expansion section 27 prior to entering the exhaust gas heat exchanger 28. The exhaust gases subsequently travel axially through the exhaust gas passages 66 disposed between adjacent pairs of fluid conduits 46 and subsequently exit the heat exchanger 28. The exhaust gases exiting the heat exchanger 28 may exit directly to the exterior environment, or may pass through a nozzle section prior to exiting to the exterior environment. The nozzle section may be configured to utilize the exhaust gases to produce motive thrust in some applications.

Also during operation, fluid from a fluid source (e.g., a fuel source 26 or a water source) may be supplied to the fluid port 50 of the heat exchanger 28. From there, the fluid passes into the central conduit 52. The fluid passes from the central conduit 52 to the radially innermost fluid conduit 46 via the one or more inter-conduit passages 48 providing fluid communication between the central conduit 52 and the radially innermost fluid conduit 46. The fluid thereafter travels throughout the fluid conduits 46 of the heat exchanger 28 until the fluid flow reaches the outer radial plenum 54. As described above, in some embodiments, the fluid path through the nested fluid conduits 46 may follow a serpentine path through the fluid conduits 46; e.g., see FIG. 6.

The present disclosure heat exchanger 28 is described above in configurations wherein the fluid to be heated enters the heat exchanger 28 centrally and moves collectively radially outward until it reaches the outer radial plenum 54. The present disclosure is not limited to this particular configuration. For example, in alternative configurations the fluid flow to be heated may be introduced to the heat exchanger 28 at the outer radial plenum 54 and the fluid path through the heat exchanger 28 may direct the fluid flow radially inward, where it may be collected within the central conduit 52.

Figure 9:
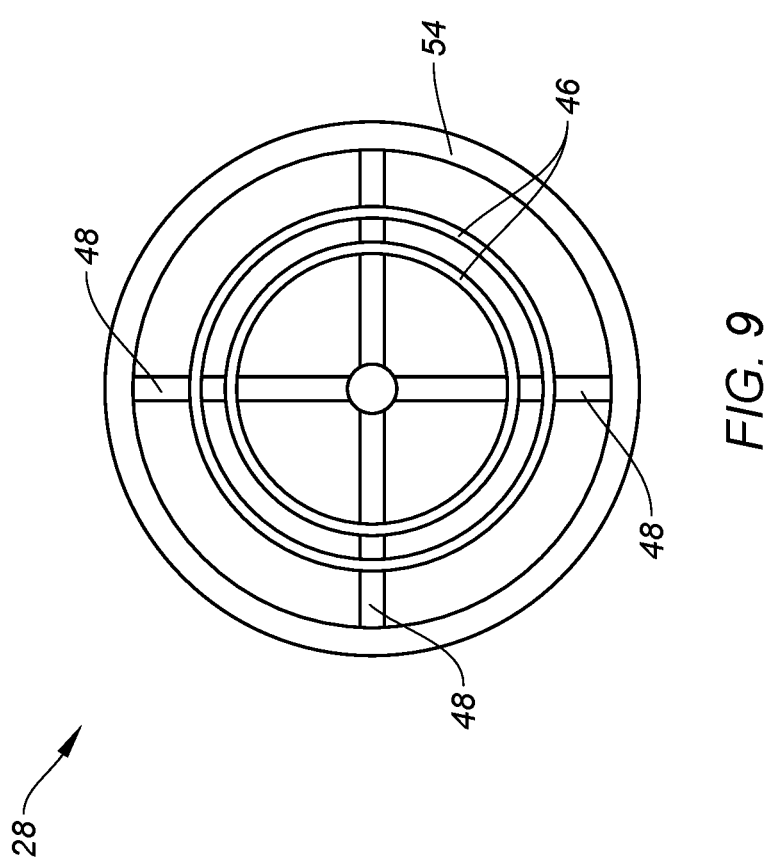
FIG. 9 is a diagrammatic end view of a present disclosure exhaust gas heat exchanger embodiment.

Embodiments of the present disclosure heat exchanger 28 are shown in the FIGURES in configurations wherein the fluid flow to be heated is introduced centrally (e.g., within the central conduit 52) and some number of fluid conduits 46 within a nested configuration are symmetrically spaced apart from one another. The present disclosure is not limited to these configurations. In some embodiments, the present disclosure heat exchanger 28 may have a single fluid conduit 46. In some embodiments, the present disclosure heat exchanger 28 may have a plurality of fluid conduits 46 within a nested configuration, and those fluid conduits 46 may be located in a particular radial region. For example, FIG. 9 diagrammatically illustrates a present disclosure heat exchanger 28 having a pair of fluid conduits 46 in a nested configuration and the pair of fluid conduits 46 are disposed in a middle radial region of the heat exchanger 28. Alternatively, the pair of fluid conduits 46 may be disposed in an inner radial region of the heat exchanger 28, or in an outer radial region of the heat exchanger 28. These configuration examples are provided to illustrate the ability of the present disclosure to be configured for use in a variety of different applications.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc. The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An aircraft propulsion system, comprising:
a turbine engine configured to produce exhaust gases during combustion; and
an exhaust gas heat exchanger extending axially along a central axis between a forward end and an aft end, the exhaust gas heat exchanger disposed to receive the exhaust gases from the turbine engine, the exhaust gas heat exchanger including:
a central conduit disposed radially inside of a plurality of fluid conduits;
a fluid port configured to provide fluid communication between a source of fluid to be heated and the central conduit;
an outer radial plenum disposed radially outside of the plurality of fluid conduits;
the plurality of fluid conduits disposed in a nested arrangement, each fluid conduit having an inner radial wall and an outer radial wall, the inner radial wall and the outer radial wall each extending axially between the forward end and the aft end, and the inner radial wall radially separated from the outer radial wall to form an internal fluid passage therebetween, wherein each said fluid conduit of the plurality of fluid conduits is radially spaced apart from adjacent said fluid conduits to define an axially extending exhaust gas passage disposed between adjacent said fluid conduits;
a plurality of inter-conduit passages, including at least one said inter-conduit passage configured to provide fluid communication between the central conduit and a first said fluid conduit of the plurality of fluid conduits, and at least one said inter-conduit passage configured to provide fluid communication between the first said fluid conduit and a second said fluid conduit of the plurality of fluid conduits;
wherein a serpentine fluid flow path extends from the central conduit, axially through the plurality of fluid conduits, the plurality of inter-conduit passages, and the outer radial plenum.

2. The aircraft propulsion system of claim 1, wherein the exhaust gas heat exchanger is disposed relative to the turbine engine such that the exhaust gases from the turbine engine enter the forward end of the exhaust gas heat exchanger, pass through the exhaust gas passages disposed between adjacent said fluid conduits, and exit the aft end of the exhaust gas heat exchanger.

3. The aircraft propulsion system of claim 2, wherein each fluid conduit has an axially extending cylindrical configuration.

4. The aircraft propulsion system of claim 3, wherein each fluid conduit has a circular cross-sectional geometry.

5. The aircraft propulsion system of claim 4, wherein the circular cross-sectional geometry extends at a constant radius.

6. The aircraft propulsion system of claim 4, wherein the circular cross-sectional geometry extends circumferentially in a wavy configuration.

7. The aircraft propulsion system of claim 3, wherein the plurality of fluid conduits disposed in a nested arrangement are concentric with one another.

8. The aircraft propulsion system of claim 1, wherein the plurality of inter-conduit passages includes a first set of said inter-conduit passages disposed at a first circumferential position, and a second set of said inter-conduit passages disposed at a second circumferential position.

9. The aircraft propulsion system of claim 8, wherein at least one said inter-conduit passage within the first set of said inter-conduit passages is disposed adjacent to the forward end of the heat exchanger at the first circumferential position, and at least one said inter-conduit passage within the first set of said inter-conduit passages is disposed adjacent to the aft end of the heat exchanger at the first circumferential position.

10. The aircraft propulsion system of claim 9, wherein at least one said inter-conduit passage within the second set of said inter-conduit passages is disposed adjacent to the forward end of the heat exchanger at the second circumferential position, and at least one said inter-conduit passage within the second set of said inter-conduit passages is disposed adjacent to the aft end of the heat exchanger at the second circumferential position.

11. The aircraft propulsion system of claim 8, wherein each fluid conduit has a circumference, and the internal fluid passage of each said fluid conduit is configured to have a first circumferential segment and a second circumferential segment, the first circumferential segment and the second circumferential segment fluidly isolated from one another; and
wherein the first set of said inter-conduit passages are in fluid communication with the first circumferential segment, and the second set of said inter-conduit passages are in fluid communication with the second circumferential segment.

12. The aircraft propulsion system of claim 1, further comprising a flow expansion section disposed between a turbine section exit of the turbine engine and the exhaust gas heat exchanger, wherein the turbine section exit had a first diameter and the exhaust gas heat exchanger has a second diameter, wherein the second diameter is greater than the first diameter, and the flow expansion section provides a flow transition boundary between the turbine section exit and the exhaust gas heat exchanger.

13. The aircraft propulsion system of claim 1, wherein one or more of the exhaust gas conduits include a plurality of first heat transfer features that extend into a first flow path defined by the respective exhaust gas conduit.

14. The aircraft propulsion system of claim 1, wherein the fluid port is disposed at the aft end of the exhaust gas heat exchanger.

15. The aircraft propulsion system of claim 1, wherein the central conduit extends along the central axis between the forward end and the aft end of the exhaust gas heat exchanger.

16. A turbine engine exhaust gas heat exchanger that extends along a central axis between a forward end and an aft end, comprising:
- a central conduit disposed radially inside of a plurality of fluid conduits;
- a fluid port configured to provide fluid communication between a source of fluid to be heated and the central conduit;
- an outer radial plenum disposed radially outside of the plurality of fluid conduits;
- the plurality of fluid conduits disposed in a nested arrangement, each fluid conduit having an inner radial wall and an outer radial wall, the inner radial wall and the outer radial wall each extending axially between the forward end and the aft end, and the inner radial wall radially separated from the outer radial wall to form an internal fluid passage therebetween, wherein each said fluid conduit of the plurality of fluid conduits is radially spaced apart from adjacent said fluid conduits to define an axially extending exhaust gas passage disposed between adjacent said fluid conduits; and
- a plurality of inter-conduit passages, including at least one said inter-conduit passage configured to provide fluid communication between the central conduit and a first said fluid conduit of the plurality of fluid conduits, and at least one said inter-conduit passage configured to provide fluid communication between the first said fluid conduit and a second said fluid conduit of the plurality of fluid conduits;
- wherein a serpentine fluid flow path extends from the central conduit, axially through the plurality of fluid conduits, the plurality of inter-conduit passages, and the outer radial plenum.

17. The turbine engine exhaust gas heat exchanger of claim 16, wherein each fluid conduit has a cylindrical configuration that extends axially between the forward end and the aft end.

18. The turbine engine exhaust gas heat exchanger of claim 17, wherein the plurality of inter-conduit passages includes a first set of said inter-conduit passages disposed at a first circumferential position, and a second set of said inter-conduit passages disposed at a second circumferential position.

19. The turbine engine exhaust gas heat exchanger of claim 18, wherein at least one said inter-conduit passage within the first set of said inter-conduit passages is disposed adjacent to the forward end of the heat exchanger at the first circumferential position, and at least one said inter-conduit passage within the first set of said inter-conduit passages is disposed adjacent to the aft end of the heat exchanger at the first circumferential position.

20. The turbine engine exhaust gas heat exchanger of claim 18, wherein each fluid conduit has a circumference, and the internal fluid passage of each said fluid conduit is configured to have a first circumferential segment and a second circumferential segment, the first circumferential segment and the second circumferential segment fluidly isolated from one another; and
- wherein the first set of said inter-conduit passages are in fluid communication with the first circumferential segment, and the second set of said inter-conduit passages are in fluid communication with the second circumferential segment.

* * * * *